(12) United States Patent
Kim et al.

(10) Patent No.: US 12,737,016 B2
(45) Date of Patent: Sep. 15, 2026

(54) ELECTRONIC DEVICE COMPRISING WATERPROOF STRUCTURE AND MANUFACTURING METHOD THEREFOR

(71) Applicant: SAMSUNG ELECTRONICS CO., LTD., Suwon-si (KR)

(72) Inventors: Gyeongtae Kim, Suwon-si (KR); Taewon Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 305 days.

(21) Appl. No.: 18/243,999

(22) Filed: Sep. 8, 2023

(65) Prior Publication Data

US 2023/0422413 A1 Dec. 28, 2023

Related U.S. Application Data

(63) Continuation of application No. PCT/KR2022/003909, filed on Mar. 21, 2022.

(30) Foreign Application Priority Data

Mar. 23, 2021 (KR) ........................ 10-2021-0037330

(51) Int. Cl.
*G06F 1/16* (2006.01)

(52) U.S. Cl.
CPC .......... *G06F 1/1684* (2013.01); *G06F 1/1656* (2013.01)

(58) Field of Classification Search
CPC ..... G06F 1/1656; G06F 1/1684; H01H 13/06; H04M 1/236
See application file for complete search history.

(56) References Cited

U.S. PATENT DOCUMENTS 9,529,391 B2 12/2016 Ely
9,924,003 B2 3/2018 Jun et al.
(Continued)

FOREIGN PATENT DOCUMENTS

JP 2006344528 A 12/2006
JP 2009289639 A 12/2009
(Continued)

OTHER PUBLICATIONS

Extended European Search Report corresponding to Application No. EP22776011.3; Issue Date May 22, 2024.
(Continued)

*Primary Examiner* — James Wu
(74) *Attorney, Agent, or Firm* — CANTOR COLBURN LLP

(57) ABSTRACT

An electronic device includes a housing having an outer wall forming a side surface of the electronic device and having at least one opening and an inner wall arranged to be spaced apart from the outer wall to form a groove. The electronic device further includes an input button inserted into the opening; a waterproof member arranged between the outer wall and the inner wall and including a protrusion coming in contact with one surface of the outer wall; a switch module including a switch; and a bracket arranged between the switch module and the inner wall. The protrusion forms a structure in which the height of a first region is greater than the height of a second region on the basis of one surface of the waterproof member corresponding to the position in which the input button is arranged.

20 Claims, 14 Drawing Sheets

(56) References Cited

U.S. PATENT DOCUMENTS

| | | | |
|---|---|---|---|
| 12,019,475 | B2 | 6/2024 | Dang Van et al. |
| 2007/0034493 | A1 | 2/2007 | Kawasaki et al. |
| 2016/0086745 | A1 | 3/2016 | Seo et al. |
| 2018/0183912 | A1* | 6/2018 | Lim ...................... G06F 1/1652 |
| 2018/0358190 | A1 | 12/2018 | Lee et al. |
| 2019/0080860 | A1 | 3/2019 | Choi et al. |
| 2019/0317553 | A1* | 10/2019 | Cho ...................... G06F 1/1626 |
| 2020/0267863 | A1* | 8/2020 | Kim ...................... H04M 1/026 |
| 2021/0142962 | A1 | 5/2021 | Choi et al. |
| 2022/0137666 | A1 | 5/2022 | Dang Van et al. |

FOREIGN PATENT DOCUMENTS

| | | | |
|---|---|---|---|
| JP | 2013114766 | A | 6/2013 |
| KR | 20160034744 | A | 3/2016 |
| KR | 20170045090 | A | 4/2017 |
| KR | 20170070602 | A | 6/2017 |
| KR | 101818111 | B1 | 2/2018 |
| KR | 20190037967 | A | 4/2019 |
| KR | 20190119924 | A | 10/2019 |
| KR | 20200101143 | A | 8/2020 |
| WO | 2021025186 | A1 | 2/2021 |

OTHER PUBLICATIONS

Korean Office Action; mailed May 7, 2025; Application No. 10-2021-0037330 filed Mar. 23, 2021; 21 pages; with English translation.

Chinese Office Action for Chinese Application No. 10-2021-0037330; Report Mail Date Nov. 26, 2025 (20 Pages—with translation).

Korean Office Action for Korean Application No. 10-2021-0037330; Report Mail Date Nov. 26, 2025 (20 Pages—with translation).

European Office Action for European Application No. 22 776 011.3-1218; Report Mail Date Feb. 27, 2026 (7 Pages).

* cited by examiner

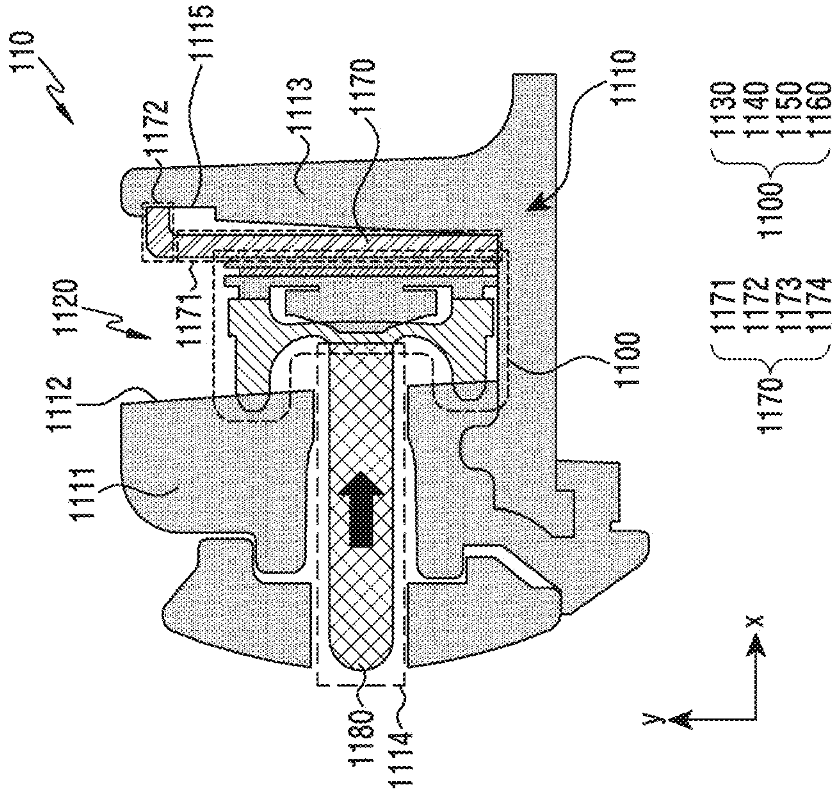
FIG. 11
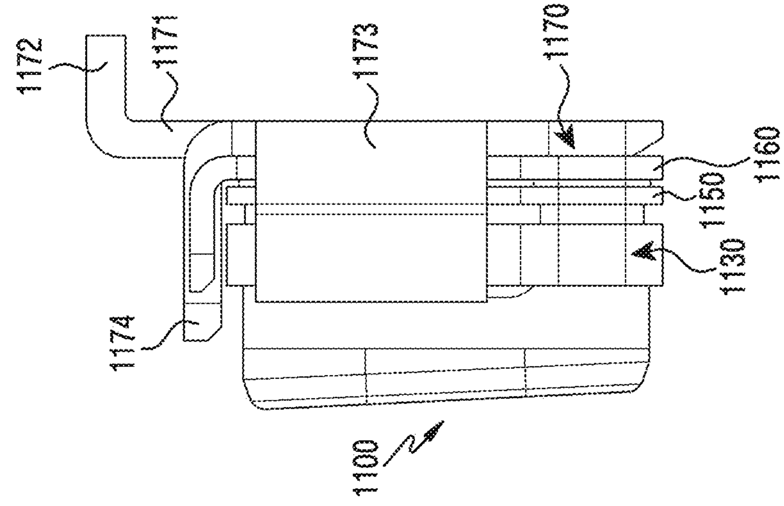

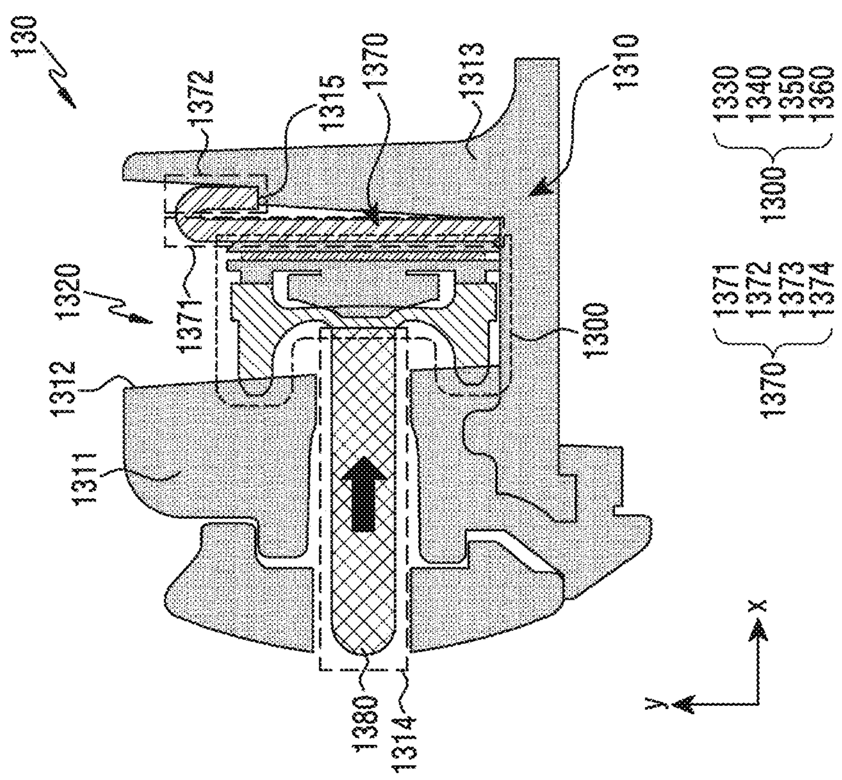
FIG. 13
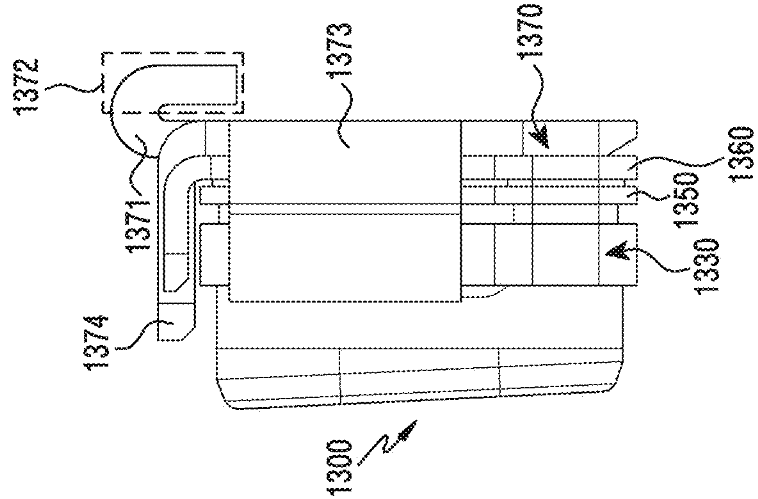

ELECTRONIC DEVICE COMPRISING WATERPROOF STRUCTURE AND MANUFACTURING METHOD THEREFOR

CROSS-REFERENCE TO RELATED APPLICATION(S

This application is a continuation application, claiming priority under § 365(c), of International Application No. PCT/KR2022/003909, filed on Mar. 21, 2022, which is based on and claims the benefit of Korean patent application number 10-2021-0037330 filed on Mar. 23, 2021, in the Korean Intellectual Property Office, the disclosures of which are incorporated by reference herein in their entireties.

TECHNICAL FIELD

Various embodiments disclosed herein generally relate to an electronic device, and in particular, a waterproof electronic device.

BACKGROUND ART

One or more keys and sensors may be disposed in an electronic device. One or more keys, for example, side keys, may be disposed on the front surface, the rear surface, or each of the front and rear surfaces of the housing of the electronic device. A portion where a side key bracket is disposed in the housing may be manufactured by using CNC machining in a shape molded by using a mold. As users always carry electronic devices, the operating environments of the electronic devices may vary in various ways depending on the external activities of the users, and may be exposed to contamination due to water or foreign substances.

DISCLOSURE OF INVENTION

Technical Problem

When a side key bracket fastener is manufactured with a mold, an inclined surface may occur on one surface of the fastener due to the characteristics of a shape manufactured with the mold. In order to remove the inclined surface of a structure supporting the side key bracket, an additional CNC machining process may be performed on the inclined surface manufactured by the mold. However, the additional CNC machining process increases the time and cost required to manufacture a housing. When the CNC machining process is omitted, the adhesion between a waterproof member and the housing is lowered due to the inclined surface. Accordingly, the waterproof performance of the waterproof member may deteriorate. A problem in which the bracket moves due to the repulsive force of the inclined surface and the waterproof member may also occur.

Solution to Problem

Various embodiments disclosed herein are capable of providing an electronic device including a waterproof structure configured to prevent water or foreign substances from entering the electronic device, and a method of manufacturing the same.

In addition, various embodiments disclosed herein are capable of providing a bracket structure that prevents movement caused due to a repulsive force of a waterproof structure. With the bracket structure, it is possible to provide an electronic device in which a manipulation feeling related to pressing a key button is improved, and a method of manufacturing the same.

An electronic device according to various embodiments of the disclosure may include a housing including an outer wall that defines a side surface of the electronic device and includes at least one opening and an inner wall spaced apart from the outer wall to provide a groove therebetween, an input button inserted into the opening, a waterproof member disposed between the outer wall and the inner wall and including a protrusion that comes into contact with one surface of the outer wall, a switch module including a switch, and a bracket disposed between the switch module and the inner wall. The protrusion may provide a structure in which a height of a first area is higher than a height of a second area with reference to a surface of the waterproof member corresponding to a position where the input button is disposed.

A method of manufacturing an electronic device according to various embodiments of the present disclosure may include molding a housing including an outer wall that defines a side surface of the electronic device and includes at least one opening and an inner wall spaced apart from the outer wall to provide a groove therebetween, a process of manufacturing a button assembly including a waterproof member that is disposed between the outer wall and the inner wall and including a protrusion that comes into contact with one surface of the outer wall, and a first bracket that faces a switch module to support a switch, wherein the switch module is disposed between the waterproof member and the first bracket, a process of inserting the button assembly from an upper end of the inner wall into the groove such that the protrusion of the waterproof member comes into contact with the one surface of the outer wall, and a process of inserting, into the groove from the upper end of the inner wall, a second bracket disposed between the button assembly and the inner wall and configured to support the button assembly.

Advantageous Effects of Invention

Based on the above discussion, according to an embodiment of the disclosure, it is possible to provide an electronic device with improved waterproof performance by making the waterproof member uniformly come into close contact with the inclined surface, and a manufacturing method thereof.

Various embodiments of the disclosure is capable of providing an electronic device in which the bracket may be prevented from moving due to a repulsive force of a waterproof member and a manipulation feeling related to pressing an input button may be improved, and a manufacturing method thereof.

BRIEF DESCRIPTION OF DRAWINGS

FIG. 11 illustrates a side view and a cross-sectional view of an electronic device according to an embodiment.

FIG. 13 illustrates a side view and a cross-sectional view of an electronic device according to an embodiment.

MODE FOR CARRYING OUT THE INVENTION

Figure 1:
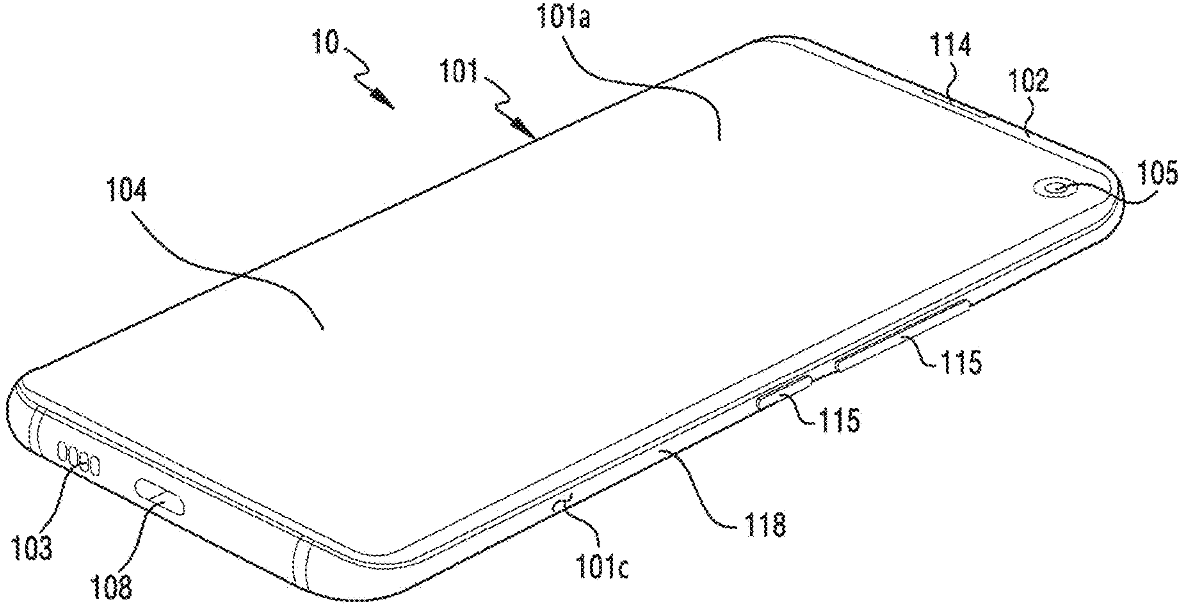
FIG. 1 is a perspective view illustrating an electronic device according to an embodiment.

Hereinafter, various embodiments of the disclosure will be described with reference to the accompanying drawings. However, it is to be understood that the description is not intended to limit the disclosure to specific embodiments and includes various modifications, equivalents, and/or alternatives of the embodiments of the disclosure. In connection with a description made with reference to the drawings, like reference numerals may be used for like elements.

In describing various embodiments of the disclosure, an electronic device may be various electronic devices having a key assembly in which key buttons are operable. Such electronic devices may include various electronic devices such as a smartphone, a tablet personal computer (PC), a mobile phone, a video phone, an e-book reader, a desktop PC, a laptop PC, a netbook computer, a personal digital assistant (PDA), a navigation system, and an MP3 player.

Figure 2:
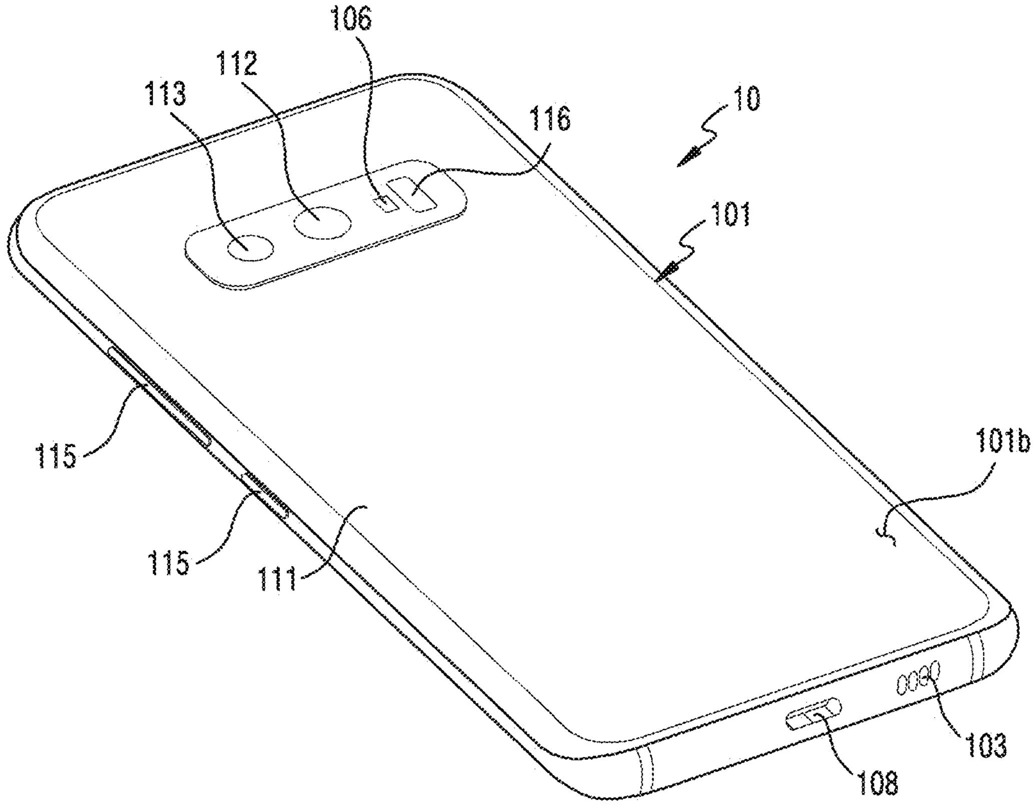
FIG. 2 is a rear perspective view of the electronic device of FIG. 1.

FIG. 1 is a perspective view illustrating an electronic device 10 according to one of various embodiments disclosed herein. FIG. 2 is a rear perspective view illustrating the electronic device 10 of FIG. 1.

Referring to FIGS. 1 and 2, the electronic device 10 according to an embodiment may include a housing 101 including a first surface (or front surface) 101*a*, a second surface (or rear surface) 101*b*, and a side surface (or side wall) 101*c* surrounding the space between the first surface 101*a* and the second surface 101*b*. In another embodiment (not illustrated), the housing may refer to a structure defining some of the first surface 101*a*, the second surface 101*b*, and the side surface 101*c* of FIG. 1.

According to an embodiment, the first surface 101*a* may be at least partially defined by a substantially transparent front surface plate 102 (e.g., a glass plate or a polymer plate including various coating layers). According to an embodiment, the front surface plate 102 may include a curved portion bent and seamlessly extending from the first surface 101*a* toward the rear surface plate 111 in at least one side edge portion.

According to various embodiments, the second surface 101*b* may be defined by a substantially opaque rear surface plate 111. The rear surface plate 111 may be made of, for example, coated or colored glass, ceramic, polymer, metal (e.g., aluminum, stainless steel (STS), or magnesium), or a combination of two or more of these materials. According to an embodiment, the rear surface plate 111 may include a curved portion bent and extending seamlessly from the second surface 101*b* toward the front surface plate 102 in at least one side edge portion.

According to various embodiments, the side surface 101*c* may be defined by a side surface bezel structure (or a "side surface member or side wall") 118 coupled to the front surface plate 102 and the rear surface plate 111 and including metal and/or polymer. In some embodiments, the rear surface plate 111 and the side surface bezel structure 118 may be integrated and may include the same material (e.g., a metal material such as aluminum).

According to an embodiment, the electronic device 10 may include at least one of a display 104, audio modules 103 and 114, a sensor module, a camera module 105, key input devices 115, and a connector hole 108. In some embodiments, in the electronic device 10, at least one of the components (e.g., the key input devices 115) may be omitted, or other components may be additionally included. For example, the electronic device 10 may include a sensor module (not illustrated). For example, in an area provided by the front surface plate 102, a sensor, such as a proximity sensor or an illuminance sensor, may be integrated into the display 104 or disposed at a position adjacent to the display 104. In some embodiments, the electronic device 10 may further include a light-emitting element, and the light-emitting element may be disposed at a position adjacent to the display 104 in the area provided by the front plate 102. The light-emitting element may provide, for example, the state information of the electronic device 10 in an optical form. In another embodiment, the light-emitting element may provide, for example, a light source that is interlocked with the operation of the camera module 105. The light-emitting element may include, for example, an LED, an IR LED, and a xenon lamp.

The display 104 may be exposed through a substantial portion of, for example, the front surface plate 102. In some embodiments, the edges of the display 104 may be provided to be substantially the same as the outer peripheral shape (e.g., a curved surface) of the front plate 102 adjacent thereto. In another embodiment (not illustrated), the distance between the periphery of the display 104 and the periphery of the front surface plate 102 may be substantially constant in order to enlarge the exposed area of the display 104. In another embodiment (not illustrated), a recess or an opening may be provided in a portion of a screen display area of the display 104, and other electronic components aligned with the recess or the opening, such as the camera module 105, a proximity sensor (not illustrated), or an illuminance sensor (not illustrated), may be included.

In another embodiment (not illustrated), at least one of camera modules 112 and 113, a fingerprint sensor 116, and a flash 106 may be included on the rear surface of the screen display area of the display 104. In another embodiment (not illustrated), the display 104 may be coupled to or disposed adjacent to a touch-sensitive circuit, a pressure sensor capable of measuring a touch intensity (pressure), and/or a digitizer configured to detect an electromagnetic field-type stylus pen.

The audio modules 103 and 114 may include a microphone hole and a speaker hole. The microphone hole may include a microphone disposed therein to acquire external sound. In some embodiments, multiple microphones may be disposed in the microphone hole to detect the direction of sound. In some embodiments, the speaker hole and the microphone hole may be implemented as a single hole 103, or a speaker (e.g., a piezo speaker) may be included without a speaker hole. The speaker hole may include an external speaker hole and a communication receiver hole 114.

By including a sensor module (not illustrated), the electronic device 10 may generate an electrical signal or data value corresponding to an internal operating state or an external environmental condition. The sensor module may further include, for example, a proximity sensor disposed on the first surface 101*a* of the housing 101, a fingerprint sensor incorporated in or disposed adjacent to the display 104, and/or a biometric sensor (e.g., an HRM sensor) disposed on the second surface 101*b* of the housing 101. The electronic device 10 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112, 113, and 106 may include a first camera device 105 disposed on the first surface 101*a* of the electronic device 10, and second camera devices 112 and 113 and/or a flash 106 disposed on the second surface 101*b* of the electronic device 100. The camera devices 105, 112, and 113 may include one or more lenses, an image sensor, and/or an image signal processor. The flash 106 may include, for example, a light-emitting diode or a xenon lamp. In some embodiments, two or more lenses (e.g., an infrared camera lens, a wide-angle lens, and a telephoto lens) and image sensors may be disposed on one surface of the electronic device 10.

The key input devices 115 may be disposed on the side surface 101*c* of the housing 101. In another embodiment, the electronic device 10 may not include some or all of the above-mentioned key input devices 115, and the key input devices 115, which are not included in the electronic device 10, may be implemented in another form, such as soft keys, on the display 104. In some embodiments, the key input devices may include at least a portion of a fingerprint sensor 116 disposed on the second surface 101*b* of the housing 101.

The connector hole 108 may accommodate a connector configured to transmit and receive power and/or data to and from an external electronic device and a connector configured to transmit and receive an audio signal to and from an external electronic device. For example, the connector hole 108 may include a USB connector or an earphone jack.

Figure 3:
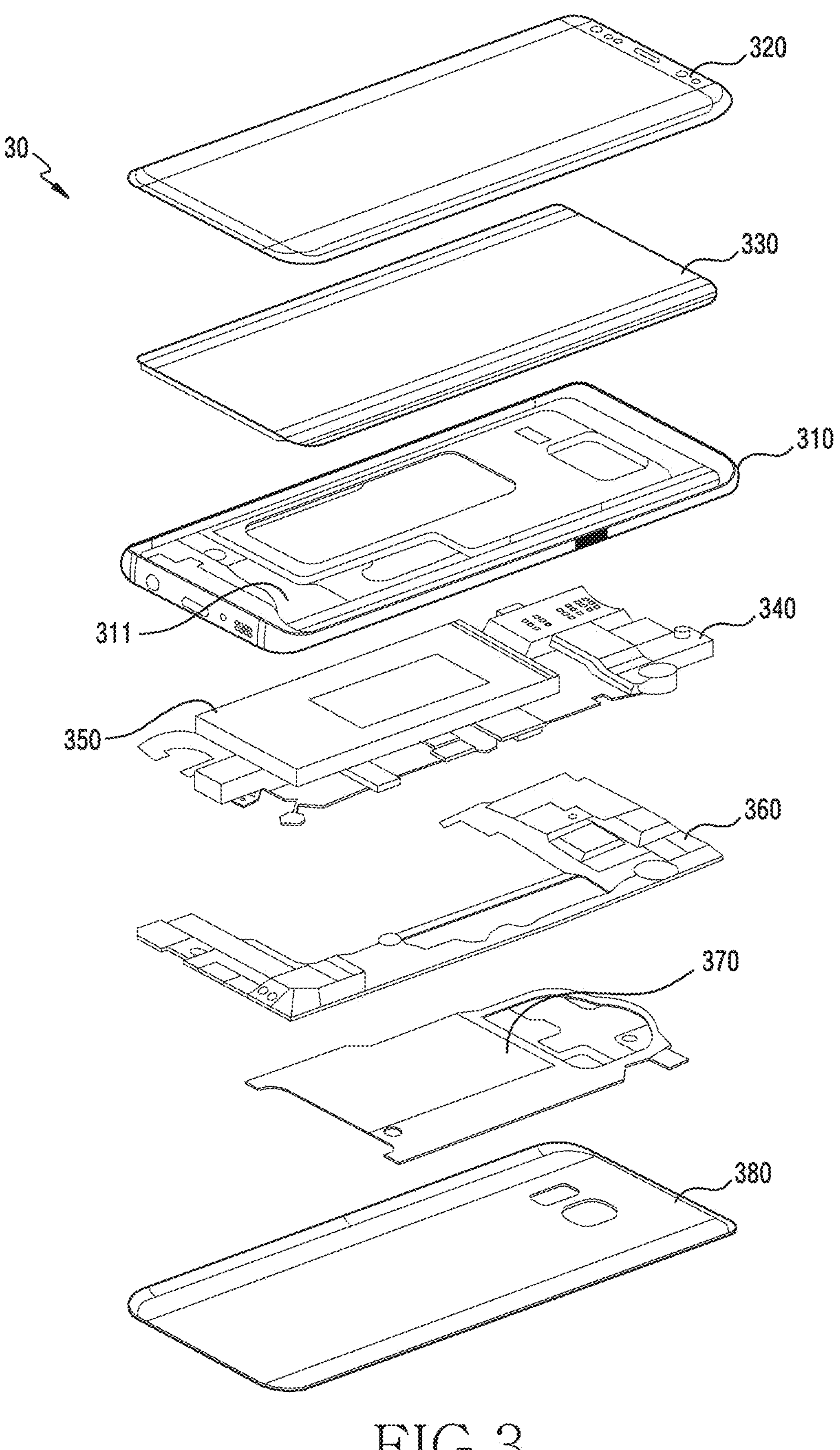
FIG. 3 is an exploded perspective view of an electronic device according to an embodiment.

Referring to FIG. 3, an electronic device 30 may include a side surface bezel structure 310, a first support member 311 (e.g., a bracket), a front surface plate 320, a display 330, a printed circuit board 340, a battery 350, a second support member 360 (e.g., a rear case), an antenna 370, and a rear surface plate 380. In some embodiments, at least one of the components (e.g., the first support member 311 or the second support member 360) may be omitted from the electronic device 30, or other components may be additionally included in the electronic device 101. At least one of the components of the electronic device 30 may be the same as or similar to at least one of the components of the electronic device 100 of FIG. 1 or 2, and a redundant description thereof will be omitted below.

The first support member 311 may be disposed inside the electronic device 30 to be connected to the side surface bezel structure 310, or may be configured integrally with the side surface bezel structure 310. The first support member 311 may be made of, for example, a metal material and/or a non-metal (e.g., polymer) material. The first support member 311 may have one surface to which the display 330 is coupled, and the other surface to which the printed circuit board 340 is coupled. A processor, a memory, and/or an interface may be mounted on the printed circuit board 340. The processor may include one or more of, for example, a central processor, an application processor, a graphics processor, an image signal processor, a sensor hub processor, or a communication processor.

The memory may include, for example, a volatile memory or a non-volatile memory.

The interface may include, for example, a high-definition multimedia interface (HDMI), a universal serial bus (USB) interface, an SD card interface, and/or an audio interface. The interface may electrically or physically connect, for example, the electronic device 30 to an external electronic device and may include a USB connector, an SD card/MMC connector, or an audio connector.

The battery 350 is a device for supplying power to at least one component of the electronic device 30, and may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed inside the electronic device 30, or may be detachably disposed on the electronic device 30.

The antenna 370 may be disposed between the rear surface plate 380 and the battery 350. The antenna 370 may include, for example, a near-field communication (NFC) antenna, a wireless charging antenna, and/or a magnetic secure transmission (MST) antenna. For example, the antenna 370 may execute short-range communication with an external device or may transmit/receive power required for charging to/from the external device in a wireless manner. In another embodiment, an antenna structure may be configured by a portion of the side surface bezel structure 310 and/or the first support member 311, or a combination thereof.

Figure 4:
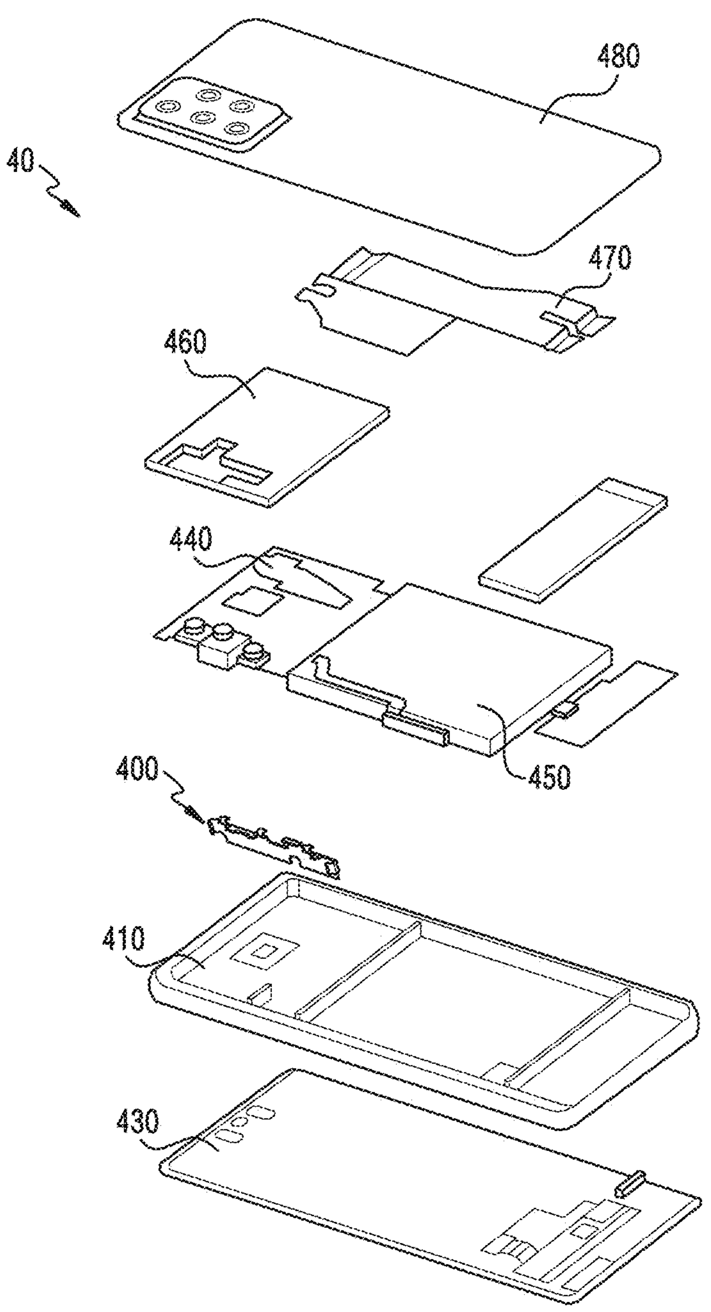
FIG. 4 is an exploded perspective view of an electronic device according to an embodiment.
Figure 5:
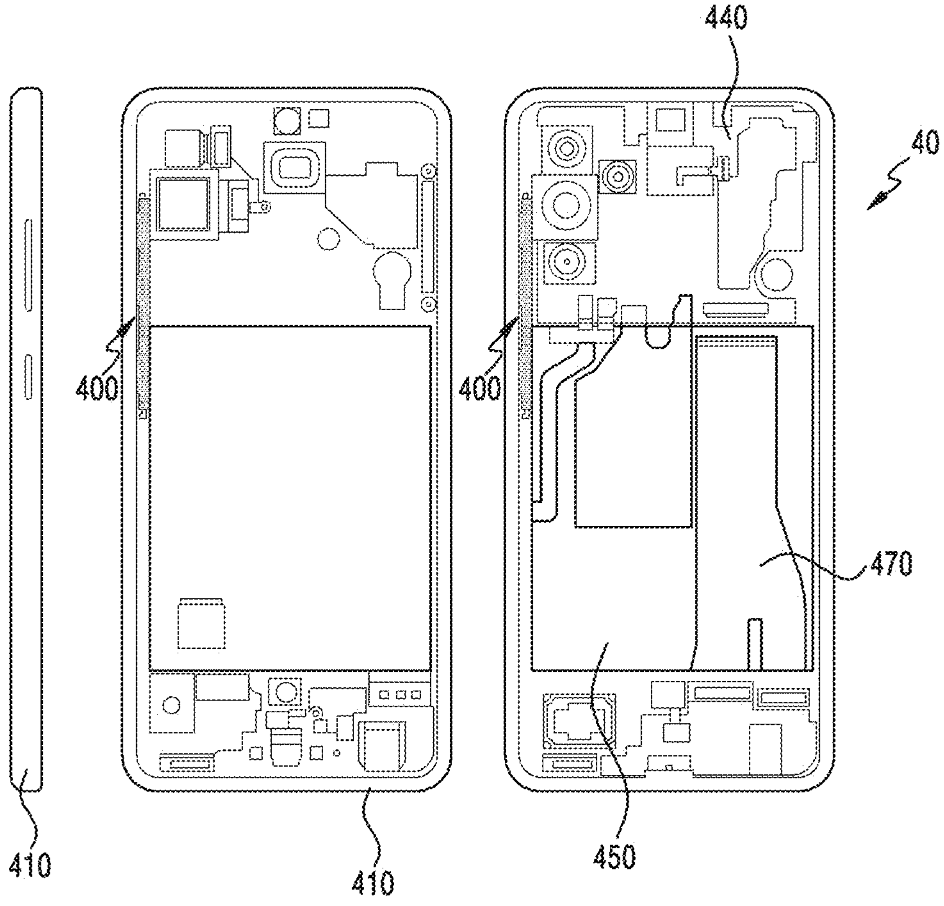
FIG. 5 illustrates a side view of the electronic device of FIG. 4 and a rear perspective view of the inside of the electronic device.

FIG. 4 is an exploded perspective view of an electronic device 40 according to an embodiment. FIG. 5 illustrates a side view of the electronic device 40 of FIG. 4 and a rear view illustrating the inside of the electronic device 40.

Referring to FIGS. 4 and 5, the electronic device 40 according to an embodiment may include an outer housing 410, a rear surface plate 480, a printed circuit board 470, a support member 460, a battery 450, a printed board assembly (PBA) 440, and a touch screen 430. In some embodiments, at least one of the above-mentioned components may be omitted from the electronic device 40, or the electronic device may additionally include other components. For example, the electronic device 40 may further include a main camera (not illustrated). At least one of the components of the electronic device 40 may be the same as or similar to at least one of the components of the electronic device 10 of FIGS. 1 and 2 or the electronic device 30 of FIG. 3, and a redundant description thereof will be omitted below.

According to an embodiment, the printed circuit board 470 may include a main flexible printed circuit board (FPCB) and an magnetic secure transfer (MST) antenna FPCB. According to an embodiment, the PBA 440 may include an assembly main PBA and an assembly sub-PBA. However, the disclosure is not limited thereto.

According to an embodiment, the electronic device 40 may further include at least one key input device 400. The key input device 400 may be mounted on the side surface of the outer housing 410. However, the disclosure is not limited thereto. For example, the key input device 400 may be mounted on an upper or lower surface of the outer housing 410. A specific configuration and arrangement of the key input device 400 according to an embodiment will be described later.

Figure 6:
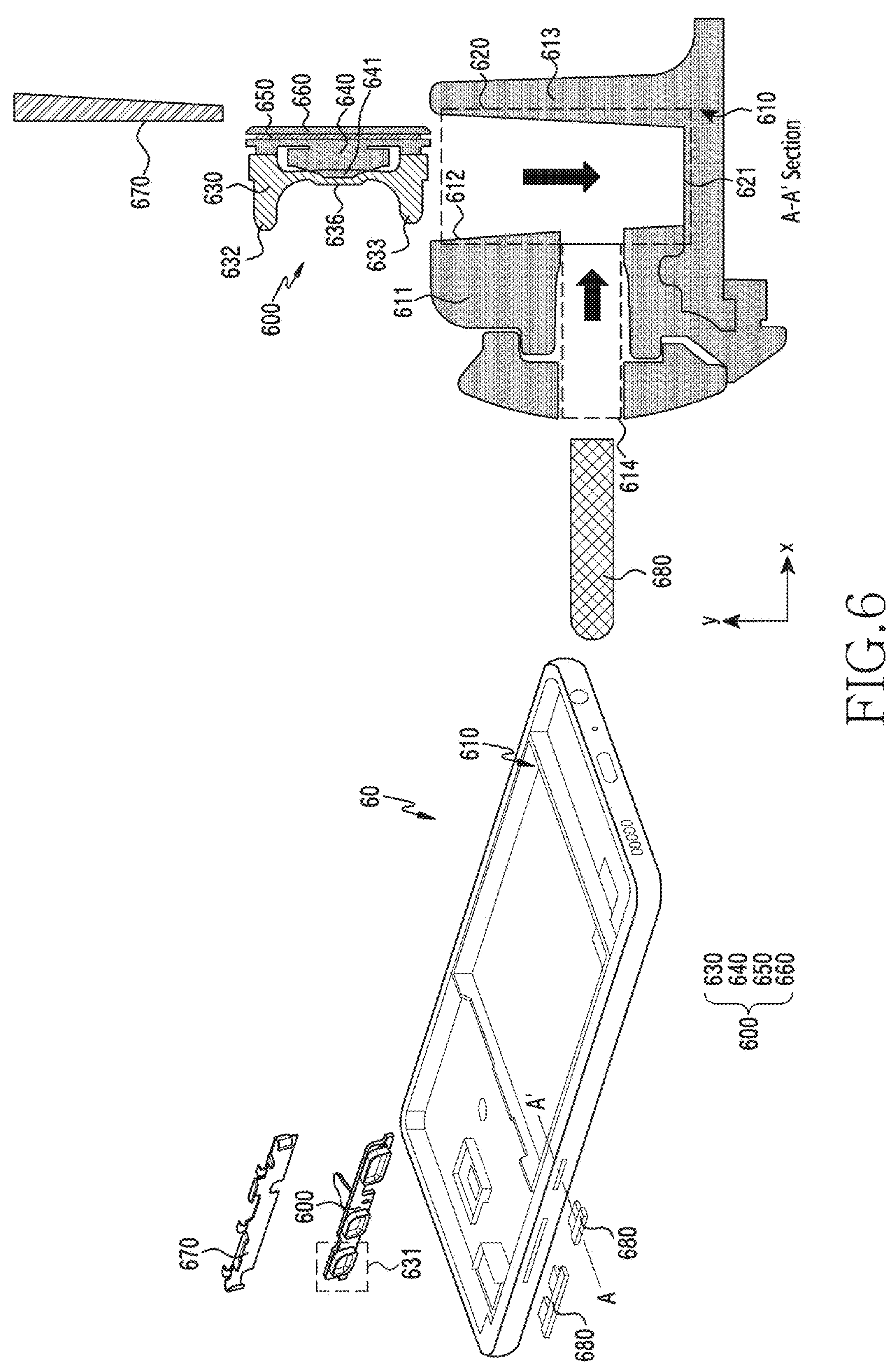
FIG. 6 illustrates an exploded perspective view of an electronic device according to an embodiment and a cross-sectional view of the same taken along the line A-A'.
Figure 7:
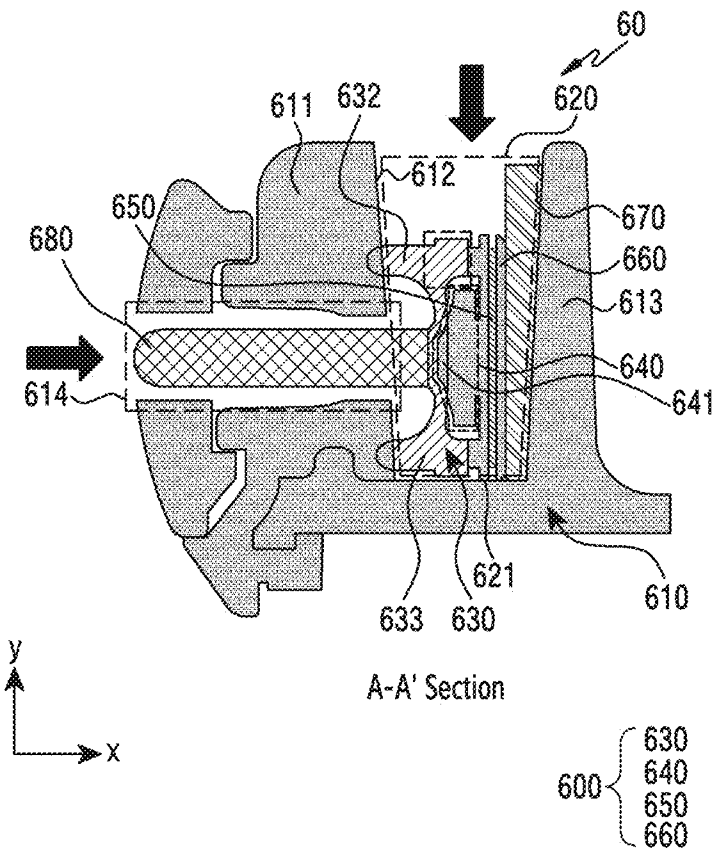
FIG. 7 is a cross-sectional view illustrating a key assembly structure of an electronic device according to an embodiment.

FIG. 6 illustrates an exploded perspective view of an electronic device 60 according to an embodiment and a cross-sectional view of the same taken along the line A-A'. FIG. 7 is a cross-sectional view illustrating a key assembly structure of an electronic device according to an embodiment.

Referring to the perspective view of FIG. 6, the electronic device 60 may include a button assembly 600, a housing 610, an input button 680, and a second bracket 670. However, the configuration of the electronic device 60 is not limited thereto. According to various embodiments, at least one of the above-described components may be omitted from the electronic device 60, or the electronic device 60 may further include one or more other components. At least one of the components of the electronic device 60 may be the same as or similar to at least one of the components of the electronic devices 10, 30, and 40 of FIGS. 1 to 5, and a redundant description thereof will be omitted below.

Referring to the cross-sectional view of FIG. 6, a housing 610 may include an outer wall 611, an inner wall 613, and at least one opening 614 in which an input button 680 may be accommodated. The at least one opening 614 may be provided in the side surface of the housing 610. For example, the at least one opening 614 may be provided in the outer wall 611. However, the opening 614 is not provided only in the side surface of the housing 610. The opening 614 may also be provided in the front surface or the rear surface of the electronic device 60.

According to an embodiment, the input button 680 may be inserted into the at least one opening 614 of the outer wall 611. The input button 680 may be inserted into the opening 614 in the x-axis direction. The input button 680 may move in the x-axis direction in the state of being inserted into the opening 614. When the input button 680 is moved in the x-axis direction, pressure may be applied to one surface of a waterproof member 630 that is in contact with a switch 641.

According to an embodiment, the inner wall 613 may be spaced apart from one surface 612 of the outer wall 611 including the opening 614. The outer wall 611 and the inner wall 613 may provide a space in the −y axis direction. The space defined by the outer wall 611 and the inner wall 613 may provide a groove 620. According to an embodiment, the button assembly 600 and the second bracket 670 may be inserted into the groove 620 in the −y-axis direction.

According to an embodiment, at least one of the one surface 612 of the outer wall 611 and the inner wall 613 may provide an inclined surface. According to an embodiment, the inclined surface may be provided to form an inclined angle with respect to a surface perpendicular to a bottom surface 621. When the housing 610 is manufactured by using a mold, since it is difficult to mold the inclined surface of the inner wall 613 in the direction perpendicular to the bottom surface 621, a gradient may be provided on the inner wall 613. Therefore, compared to the bottom surface 621 of the groove 620, the spacing between the one surface 612 and the inner wall 613 in the open surface may be provided to be wider than the bottom surface 621 of the groove 620 to allow a bracket (e.g., the second bracket 670) to be inserted into the groove 620. The inclined surface may have a gradient generated by molding the groove 620 with a mold.

According to an embodiment, the button assembly 600 may be configured with the waterproof member 630, the switch module 640 including a switch 641, and the first bracket 660. However, the configuration of the button assembly 600 is not limited thereto. According to various embodiments, at least one of the above-described components may be omitted from the button assembly 600, and one or more other components may be further included in the button assembly 600. For example, the button assembly 600 may further include a circuit board 650.

According to an embodiment, a key input device (e.g., 400 in FIG. 4) may be constituted with the button assembly 600, the second bracket 670, and the input button 680. However, the configuration of the key input device is not limited thereto. According to various embodiments, at least one of the above-described components may be omitted from the key input device, or the key input device may further include one or more other components. For example, the second bracket 670 may be omitted from the key input device.

Referring to FIGS. 6 and 7, the button assembly 600 according to an embodiment may be inserted into the groove 620 in the −y-axis direction. The button assembly 600 may be inserted such that the waterproof member 630 contacts one surface 612 of the outer wall 611. The second bracket 670 may be inserted between the inserted button assembly 600 and the inner wall 613 in the −y axis direction. At least one surface of the second bracket 670 may be in contact with the inner wall 613. The second bracket 670 may be supported by the inner wall 613 to fix the button assembly 600. At least one surface of the second bracket 670 may have a shape corresponding to at least one surface of the inner wall 613 to prevent the button assembly 600 from moving due to the repulsive force of the waterproof member 630. When the input button 680 moves in the x-axis direction, the second bracket 670 prevents the second bracket 670 and the button assembly 600 from moving due to the repulsive force of the waterproof member 630, thereby improving the click feeling of the input button 680.

According to an embodiment, the bracket (e.g., the second bracket 670) may include at least one of a steel use stainless (SUS) material or a mold. However, the bracket is not limited to the SUS material or the mold. For example, the bracket may be made of various materials such as injection-molded product, tape, or bond.

Figure 8:
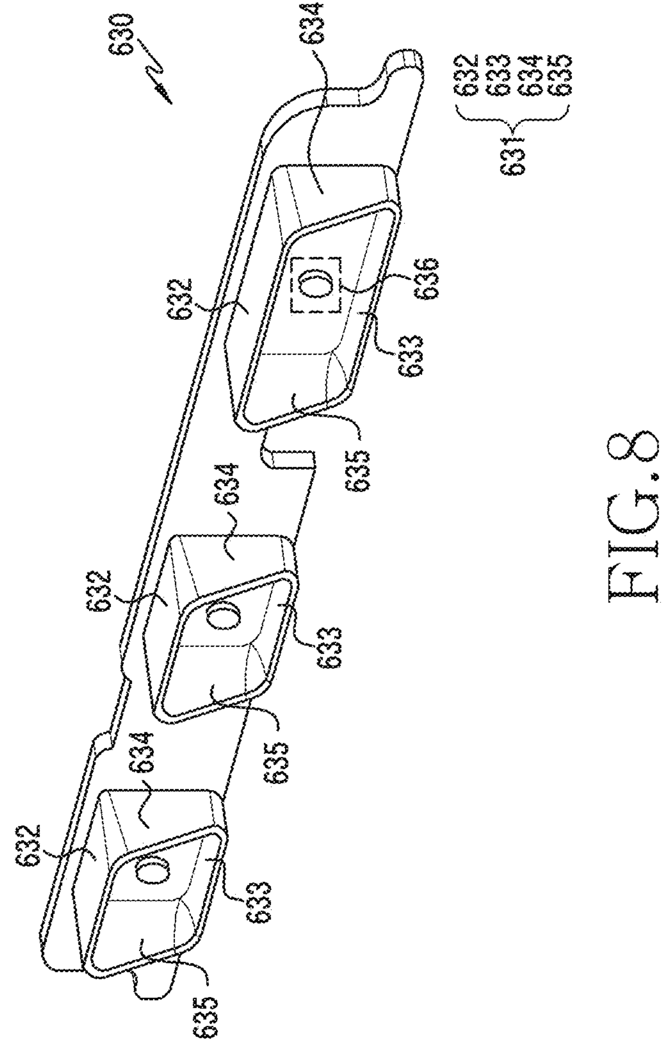
FIG. 8 is a perspective view illustrating a waterproof member of an electronic device according to an embodiment.

FIG. 8 is a perspective view illustrating a waterproof member of an electronic device according to an embodiment.

Referring to FIGS. 7 and 8, seating portions 636 on which input buttons 680 are respectively seated may be provided in the waterproof member 630 according to an embodiment. According to an embodiment, the seating portions 636 may have the shapes of protrusions respectively facing the input buttons 680. The input buttons 680 are respectively seated on the seating portions 636 and are movable in the x-axis direction. When an input button 680 is pressed on the waterproof member 630 in the x-axis direction, a pressure may be applied to the corresponding switch 641 that is in contact with the waterproof member 630.

According to an embodiment, the waterproof member 630 may seal the space between the one surface 612 of the outer wall 611 and the button assembly 600 inserted into the groove 620. By sealing the space between the one surface 612 of the outer wall 611 and the button assembly 600, the waterproof member 630 is capable of blocking inflow of foreign substances into the inside of the housing 610 from the outside of the housing 610 through at least one opening 614 in the outer wall 611.

Referring to FIGS. 7 and 8, the waterproof member 630 according to an embodiment may include one or more protrusions 631. The input buttons 680 may be accommodated in grooves surrounded by the protrusions 631. According to an embodiment, the protrusions 631 may protrude in a direction toward the one surface 612 of the outer wall 611. The protrusions 631 may be in contact with the one surface 612. The protrusions 631 may include areas that are in close contact with the one surface 612 of the outer wall 611. The areas that are in close contact with the one surface 612 are capable of sealing the space between the button assembly 600 and the one surface 612 while maintaining a pressed state between the button assembly 600 and the one surface 612 by an elastic force. The areas in which the protrusions 631 and the one surface 612 are in close contact with each other may be uniformly provided since a force is uniformly applied to the areas in which the protrusions 631 and the one surface 612 are in close contact the one surface 631 by the elastic force. For example, the pressure applied to the areas in which the protrusions 631 comes into close contact with the outer wall 611 may be uniformly distributed.

Referring to FIG. 8, a plurality of protrusions 631 may be provided at regular intervals. The distance between the protrusions 631 may vary depending on the locations of the input buttons 680. According to an embodiment, each protrusion 631 may include a first area 632 and a second area 633. The protrusion 631 may have a structure in which, with reference to one surface of the waterproof member 630 corresponding to the position where the input button (630 in FIG. 7) is disposed, a first area 632 has a height higher than the height of a second area 633. The protrusion 631 may include a third area 634 interconnecting one ends of the first area 632 and the second area 633. The protrusion 631 may include a fourth area 635 interconnecting the other ends of the first area 632 and the second area 633 and facing the third area. With reference to the one surface of the waterproof member 630 corresponding to the position where the input button is disposed, the heights of the third area 634 and the fourth area 635 may gradually increase from the second area 633 toward the first area 632. When the one surface (e.g., the one surface 612 in FIG. 7) is an inclined surface having an inclination, the structure in which the height gradually increases are capable of sealing the inclined surface and the component. The area where the protrusion 631 and the one surface come into close contact may be uniformly provided.

According to an embodiment, the first area 632, the second area 633, the third area 634, and the fourth area 635 may partially have flat surfaces. The first area 632 and the second area 633 may be parallel surfaces facing each other. The third area 634 and the fourth area 635 may be parallel surfaces facing each other. However, the configuration of the protrusion 631 is not limited to the configuration having four surfaces.

According to various embodiments, the protrusion 631 may have an oval or circular end surface. The protrusion 631 may have an end surface of a closed curve shape. According to an embodiment, the end surface of the protrusion 631 may come into contact with the one surface (e.g., the one surface 612 in FIG. 7). The end surface that is in contact with the one surface may be parallel to the one surface.

According to an embodiment, the waterproof member 630 including the protrusion 631 may be made of a rubber or silicone material. However, the waterproof member 630 is not limited to the rubber or silicone material. For example, the waterproof member 630 may be made of various elastic materials such as urethane.

Figure 9:
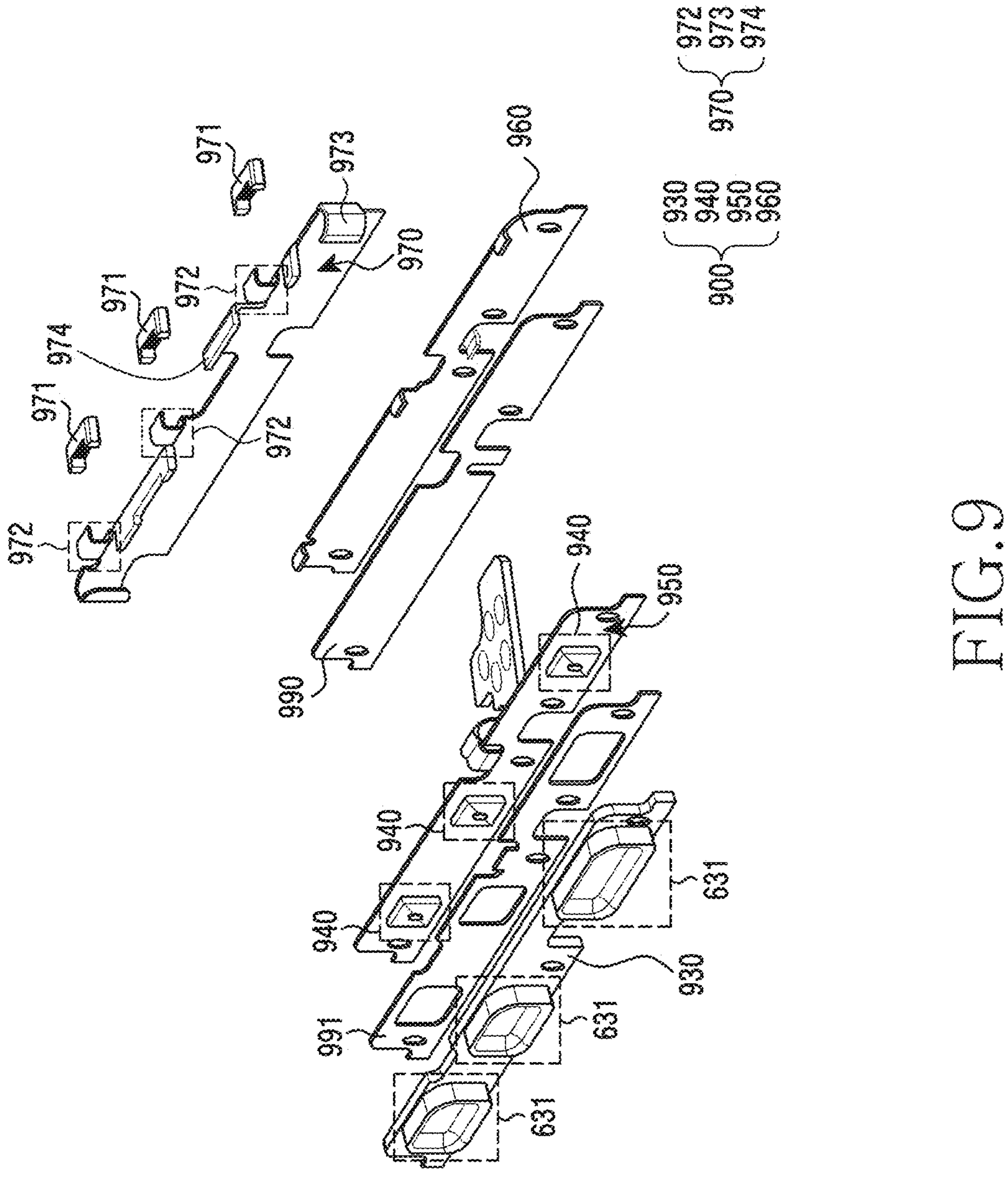
FIG. 9 is an exploded perspective view illustrating a button assembly and a bracket of an electronic device according to an embodiment.
Figure 10:
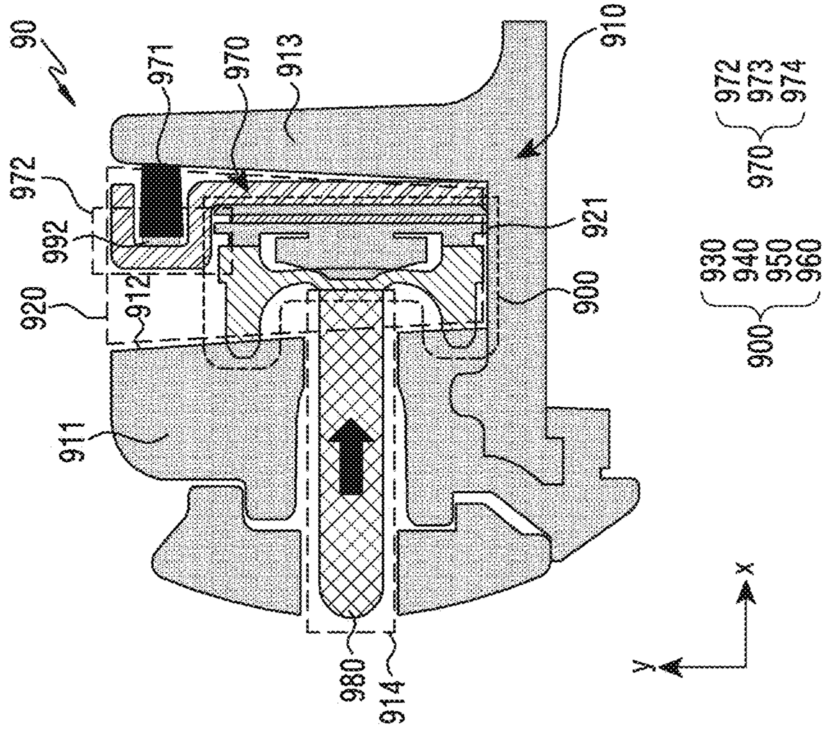
FIG. 10 illustrates a side view and a cross-sectional view of an electronic device according to an embodiment.
Figure 10:
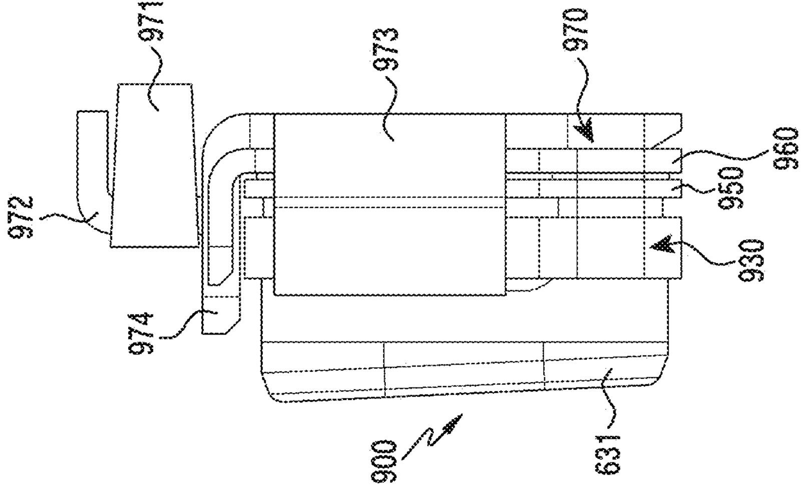

FIG. 9 is an exploded perspective view illustrating a button assembly and a bracket of an electronic device according to an embodiment. FIG. 10 illustrates a side view and a cross-sectional view of an electronic device 90 according to an embodiment.

At least one of the components of a button assembly 900 and a housing 910 according to an embodiment may be similar to or the same as at least one of the components of the button assembly 600 and the housing 610 of FIGS. 6 to 8, and a redundant duplicate description thereof will be omitted below.

Referring to FIG. 9, the button assembly 900 according to an embodiment may include a waterproof member 930, a switch module 940, a circuit board 950, and a first bracket 960. According to an embodiment, one or more switch modules 940 may be coupled to the circuit board 950. The switch modules 940 may be connected to the circuit board 950 to transmit signals to the circuit board 950.

According to an embodiment, the waterproof member 930 and the circuit board 950 may be coupled to each other by an adhesive member 991. The surface of the adhesive member 991 may be provided with openings to correspond to the switch modules 940. According to an embodiment, the adhesive member 991 may include a waterproof tape. However, the adhesive member is not limited thereto.

According to an embodiment, the circuit board 950 may be coupled to face the first bracket 960. The circuit board 950 and the first bracket 960 may be coupled by using an adhesive member 990. According to an embodiment, the adhesive member 990 may include a waterproof tape. However, the adhesive member is not limited thereto.

Referring to FIGS. 9 and 10, the electronic device 90 according to an embodiment may further include at least one or more support members 971 that come into contact with the second bracket 970. According to an embodiment, the second bracket 970 may have a structure capable of accommodating the one or more support members 971. For example, the one or more support members 971 may be accommodated in a structure capable of accommodating the support members 971 and may be fixed to the second bracket 970. According to an embodiment, the structure capable of accommodating the support members 971 may include bent portions 972. The bent portions 972 may protrude toward the upper end of the second bracket 970. According to an embodiment, the bent portions 972 may be fabricated to be bent in at least one direction. For example, the bent portions 972 may be bent in the −x-axis direction to provide spaces capable of accommodating the support members. The support members 971 may have a structure that is capable of being fitted into the bent portions 972. Referring to FIG. 9, the one or more bent portions 972 may be disposed at intervals.

Referring to FIG. 10, the at least one support member 971 according to an embodiment may be located between the second bracket 970 and the inner wall 913. One surface of the support member 971 may be coupled to the second bracket 970. The other surface of the support members 971 faces the inner wall 913 so that the support member 971 may support the second bracket 970.

According to an embodiment, the support member 971 may be connected to the second bracket 970 via an adhesive member 992. According to an embodiment, the adhesive member 992 may include a waterproof tape. However, the adhesive member is not limited thereto.

According to an embodiment, the inner wall 913 may include accommodation portions configured to accommodate the support member 971. The accommodation portion (not illustrated) configured to accommodate the support member 971 may have the shape of the accommodation portion 1115 in FIG. 11. The accommodation portion may have a recess shape recessed as much as the one surface of the support member 971 to be accommodated therein. The accommodation portion may prevent the support member 971 from moving. The support member 971 may be accommodated in the accommodation portion to fix the second bracket 970. However, the support member is not limited to this shape. For example, a bump may be provided on the inner wall 913 and a recess may be provided on one surface of the support member 971 to fix the support member 971 and the second bracket 970.

According to an embodiment, the other surface of the second bracket 970 may further include at least one surface (not illustrated) that is in contact with the inner wall 913. The second bracket 970 may have a shape in which the thickness increases from the bottom surface 921 of the groove 920 toward the bent portion 972 such that at least one surface of the second bracket 970 comes into contact with the inner wall 913. The one surface of the second bracket 970 that comes into contact with the inner wall 913 may be parallel to the inner wall 913. The button assembly 900 may be fixed by being in contact with the second bracket 970 and the inner wall 913 of the support member 971 at the same time. The second bracket 970 may fix the button assembly 900 to prevent the button assembly 900 from moving due to the repulsive force of the waterproof member 930. The second bracket 970 may improve the click feeling of the input button 980 by preventing the button assembly 900 from moving when the input button 980 moves in the x-axis direction. The second bracket 970 is capable of sealing the space between the housing 910 and the waterproof member 930 by preventing the button assembly 900 from moving when the input button 980 moves in the x-axis direction. The waterproof member 930 is capable of blocking inflow of foreign substances into the housing 910 from the outside of the housing 910 through an opening 914 in the housing 910.

According to an embodiment, the at least one support member 971 may be a molded member. However, the support member is not limited thereto. For example, the support member 971 may be made of a rubber or silicone material. In addition, the support member 971 may be made of various elastic materials such as urethane. According to an embodiment, the support member 971 may be made of a metal material including an elastic structure. For example, the support member 971 may have a spring or coil shape.

According to an embodiment, the second bracket 970 may further include at least one first fixing member 973. The first fixing member 973 may be provided on at least one end of the second bracket 970. For example, the first fixing member 973 may be provided at one end of a side surface of the second bracket 970. According to an embodiment, the first fixing member 973 may include a bent shape. Referring to FIG. 10, at least a portion of the button assembly 900 may be accommodated in the bent portion of the first fixing member 973. For example, the waterproof member 930, the switch module 940, the circuit board 950, and the first bracket 960 may be accommodated in the bent portion of the first fixing member 973. At least a portion of the button assembly 900 may be accommodated in the first fixing member 973 to fix the button assembly 900. The button assembly 900 may be accommodated in the at least one first fixing member 973 so that the first fixing member 973 can prevent the button assembly 900 from moving in the x-axis direction.

According to an embodiment, the second bracket 970 may further include at least one second fixing member 974. The second fixing member 974 may be provided at one end of the second bracket 970. For example, the second fixing member 974 may be provided at one end of the second bracket 970 where the bent portion 972 is provided. According to an embodiment, the second fixing member 974 may protrude in a direction corresponding to the button assembly 900. For example, the second fixing member 974 may have a plate shape protruding in the −x-axis direction. However, the second fixing member is not limited thereto. For example, the second fixing member 974 may have a bent shape like the first fixing member 973. The button assembly 900 may be disposed below the second fixing member 974 in the −y axis direction. The button assembly 900 may be disposed below the at least one second fixing member 974 so that the second fixing member 974 can prevent the button assembly 900 from moving in the y-axis direction.

FIG. 11 illustrates a side view and a cross-sectional view of an electronic device 110 according to an embodiment. At least one of the components of a button assembly 1100 and a housing 1110 according to an embodiment may be similar to or the same as at least one of the components of the button assembly 600 and the housing 610 of FIGS. 6 to 8, and a redundant duplicate description thereof will be omitted below.

Referring to FIG. 11, the electronic device 110 may include a circuit board 1150 and a second bracket 1170. According to an embodiment, the second bracket 1170 may be disposed between the button assembly 1100 and the inner wall 1113. According to an embodiment, the second bracket 1170 may be disposed to face the first bracket 1160. The second bracket 1170 may be provided such that at least one surface thereof comes into contact with the inner wall 1113. According to an embodiment, the second bracket 1170 may be located between the first bracket 1160 and the inner wall 1113 and may include a first portion 1171 facing the first bracket 1160. The first portion 1171 may be inserted into the groove 1120 from the upper end of the inner wall 1113 (in the −y-axis direction). The second bracket 1170 may include a second portion 1172 that is bent from the first portion 1171 toward the inner wall 1113 and extends. The second portion 1172 may include a surface that comes into contact with the inner wall 1113. The surface that comes into contact with the inner wall 1113 may be parallel to the inner wall 1113. The second portion 1172 may come into contact with the inner wall 1113 to support the second bracket 1170. The second bracket 1170 may fix the button assembly 1100 to prevent the button assembly 1100 from moving due to the repulsive force of the waterproof member 1130. The second bracket 1170 may improve the click feeling of the input button 1180 by preventing the button assembly 1100 from moving when the input button 1180 moves in the x-axis direction. The second bracket 1170 is capable of sealing the space between the housing 1110 and the waterproof member 1130 by preventing the button assembly 1100 from moving when the input button 1180 moves in the x-axis direction. The waterproof member 1130 is capable of blocking inflow of foreign substances into the housing 1110 from the outside of the housing 1110 through an opening 1114 in the housing 1110.

According to an embodiment, the inner wall 1113 may include a space that accommodates the second portion 1172. The space may have a shape of a recess 1115 recessed as much as one surface of the second portion 1172 to be accommodated therein. The recess 1115 may prevent the second bracket 1170 from moving in the y-axis direction. The second portion 1172 may be accommodated in one surface of the recess 1115 to fix the button assembly 1100. However, the second portion is not limited to this shape. For example, the second bracket 1170 may be fixed by providing a bump on the inner wall 1113 and providing a recess the one surface of the second portion 1172.

According to an embodiment, the second bracket 1170 may further include at least one of at least one first fixing member 1173 or at least one second fixing member 1174. Structures of the first fixing member 1173 and the second fixing member 1174 may be the same as or similar to the structures of the first fixing member 973 and the second fixing member 974 of FIGS. 9 and 10, and the description made with reference to FIGS. 9 and 10 may be applicable thereto.

Figure 12:
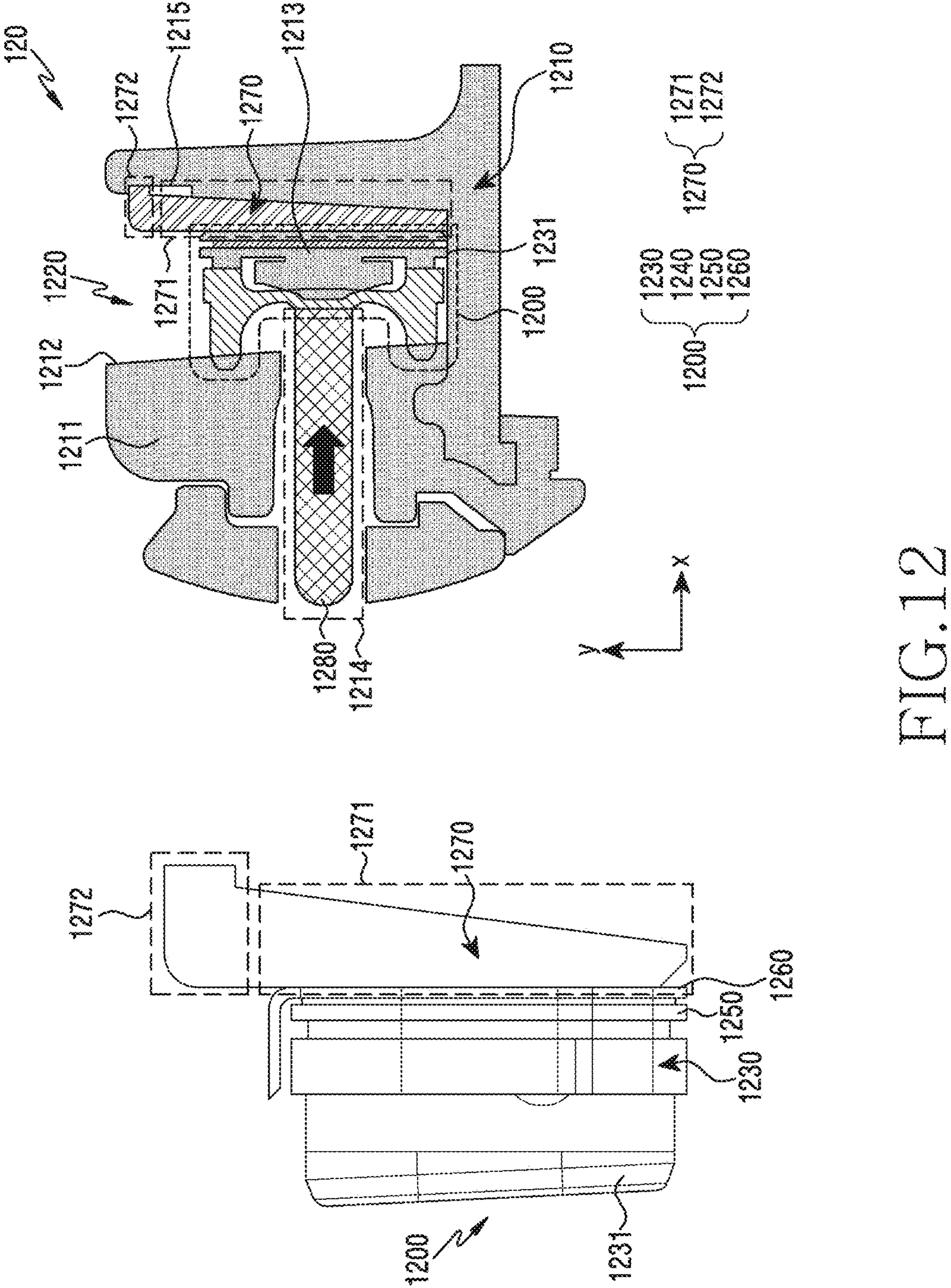
FIG. 12 illustrates a side view and a cross-sectional view of an electronic device according to an embodiment.

FIG. 12 illustrates a side view and a cross-sectional view of an electronic device 120 according to another embodiment.

At least one of the components of a button assembly 1200, a housing 1210, and circuit board 1250 according to an embodiment may be similar to or the same as at least one of the components of the button assembly 600, the housing 610, and circuit board 650 of FIGS. 6 to 8, and a redundant duplicate description thereof will be omitted below.

Referring to FIG. 12, the electronic device 120 may include a second bracket 1270. According to an embodiment, the second bracket 1270 may be disposed between the button assembly 1200 and the inner wall 1213. According to an embodiment, the second bracket 1270 may be disposed to face the first bracket 1260. The second bracket 1270 may be provided such that at least one surface thereof comes into contact with the inner wall 1213. According to an embodiment, the second bracket 1270 may be located between the first bracket 1260 and the inner wall 1213 and may include a first portion 1271 facing the first bracket 1260. The first portion 1271 may be inserted into the groove 1220 from the upper end of the inner wall 1213 (in the −y-axis direction). The second bracket 1270 may include a second portion 1272 that is bent from the first portion 1271 toward the inner wall 1213 and extends. The second portion 1272 may include a surface that comes into contact with the inner wall 1213. The surface that comes into contact with the inner wall 1213 may be parallel to the inner wall 1213. The second portion 1272 may come into contact with the inner wall 1213 to fix the button assembly 1200. The second bracket 1270 may fix the button assembly 1200 to prevent the button assembly 1200 from moving due to the repulsive force of the waterproof member 1230. The second bracket 1270 may improve the click feeling of the input button 1280 by preventing the button assembly 1200 from moving when the input button 1280 moves in the x-axis direction. The second bracket 1270 is capable of sealing the space between the housing 1210 and the waterproof member 1230 by preventing the button assembly 1200 from moving when the input button 1280 moves in the x-axis direction. The waterproof member 1230 is capable of blocking inflow of foreign substances into the housing 1210 from the outside of the housing 1210 through an opening 1214 in the housing 1210.

According to an embodiment, the inner wall 1213 may include an accommodation portion 1215 configured to accommodate the second portion 1272. The accommodation portion 1215 may have a recess shape recessed as much as one surface of the second portion 1272 to be accommodated therein. The accommodation portion 1215 may prevent the second bracket 1270 from moving in the −y-axis direction. The second portion 1272 may be accommodated in the accommodation portion 1215 to fix the button assembly 1200. However, the second portion is not limited to this shape. For example, a bump may be provided on the inner wall 1213 and a recess may be provided on the one surface of the second portion 1272 to fix the second bracket 1270.

According to an embodiment, another surface of the first portion 1271 may further include at least one surface that comes into contact with the inner wall 1213. The first portion 1271 may have a shape in which the thickness increases from the bottom surface 1231 of the groove 1220 toward the second portion 1272 to come into contact with the inner wall 1213. The one surface of the first portion 1271 that comes into contact with the inner wall 1213 may be parallel to the inner wall 1213. The second bracket 1270 may come into contact with one surface of the accommodation portion 1215 and the inner wall 1213 at the same time to fix the button assembly 1200.

FIG. 13 illustrates a side view and a cross-sectional view of an electronic device 130 according to an embodiment.

At least one of the components of a button assembly 1300 and a housing 1310 according to an embodiment may be similar to or the same as at least one of the components of the button assembly 600 and the housing 610 of FIGS. 6 to 8, and a redundant duplicate description thereof will be omitted below.

Referring to FIG. 13, the electronic device 130 may include a circuit board 1350 and a second bracket 1370. According to an embodiment, the second bracket 1370 may be disposed between the button assembly 1300 and the inner wall 1313. According to an embodiment, the second bracket 1370 may be disposed to face the first bracket 1360. The second bracket 1370 may be provided such that at least one surface thereof comes into contact with the inner wall 1313. According to an embodiment, the second bracket 1370 may include a first portion 1371 that faces the first bracket 1360 and is inserted into the groove 1320 from the upper end of the inner wall 1313. The second bracket 1370 may include a second portion 1372 that is bent to be directed in the direction in which one end of the first portion 1371 is directed. One surface of the second portion 1372 may come into contact with the inner wall 1313. One surface of the second portion 1372 that comes into contact with the inner wall 1313 may be parallel to the inner wall 1313. According to an embodiment, at least a portion of the inner wall 1313 may be recessed in a direction toward the inside of the groove 1320. Since at least a portion of the inner wall 1313 is recessed, the inner wall 1313 may have a shape of a flange 1315 protruding inside the groove 1320. One end of the second portion 1372 may be in contact with one surface of the flange 1315. The one end of the second portion 1372 may have a surface parallel to the flange 1315.

According to an embodiment, another surface of the first portion 1371 may further include at least one surface that comes into contact with the inner wall 1313. The second bracket 1370 may come into contact with one surface of the flange 1315 and the inner wall 1313 at the same time to fix the button assembly 1300. The second bracket 1370 is capable of sealing the space between the housing 1310 and the waterproof member 1330 by preventing the button assembly 1300 from moving when the input button 1380 moves in the x-axis direction. The waterproof member 1330 is capable of blocking inflow of foreign substances into the housing 1310 from the outside of the housing 1310 through an opening 1314 in the housing 1310.

According to an embodiment, the second bracket 1370 may further include at least one of at least one first fixing member 1373 or at least one second fixing member 1374. Structures of the first fixing member 1373 and the second fixing member 1374 may be the same as or similar to the structures of the first fixing member 973 and the second fixing member 974 of FIGS. 9 and 10, and the description made with reference to FIGS. 9 and 10 may be applicable thereto.

Figure 14:
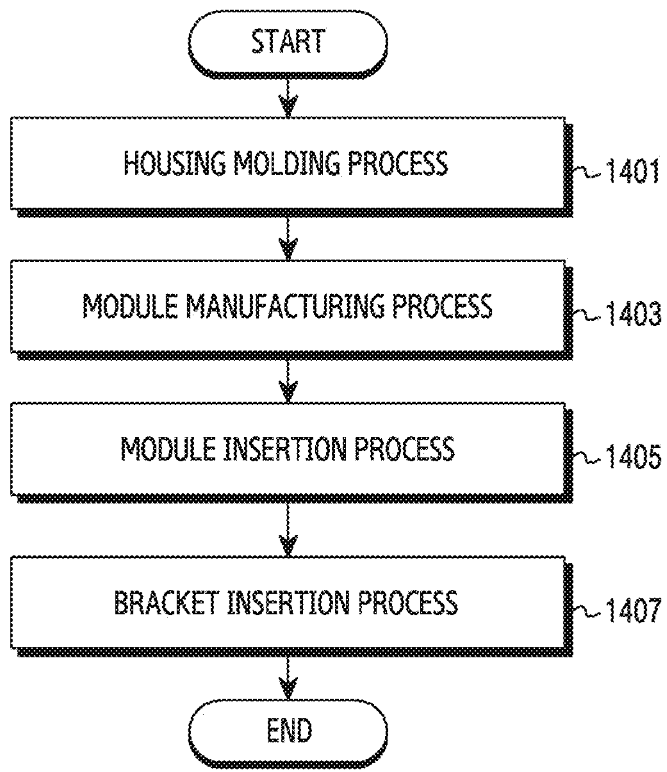
FIG. 14 is a flowchart illustrating an electronic device manufacturing method according to an embodiment.

FIG. 14 is a flowchart illustrating an electronic device manufacturing method according to an embodiment.

Regarding the structure of the button assembly 600 and the housing 610, the structure of the electronic device 60 of FIGS. 6 to 8 may be referred to. The same reference numerals are used for the same or substantially the same components as those described above, and a redundant description will be omitted.

Referring to FIG. 14, an electronic device manufacturing method according to various embodiments may include a housing molding process, a module manufacturing process, a module insertion process, and a bracket insertion process.

According to an embodiment, in process 1401, the housing 610 including the groove 620 may be molded by using a mold. According to an embodiment, the one surface 612 or the inner wall 613 of the outer wall 611 may provide an inclined surface. According to an embodiment, the inclined surface may be provided to form an inclined angle with respect to a surface perpendicular to a bottom surface 621. When the housing 610 is manufactured by using a mold, since it is difficult to mold the inclined surface of the inner wall 613 in the direction perpendicular to the bottom surface 621, a gradient may be provided on the inner wall 613. Therefore, compared to the bottom surface 621 of the groove 620, the spacing between the one surface 612 and the inner wall 613 in the open surface may be provided to be wider than the bottom surface 621 of the groove 620 to allow a bracket to be inserted into the groove 620. According to an embodiment, the groove 620 may be manufactured by using a casting mold or an injection mold.

According to an embodiment, in the electronic device 60 manufacturing method, the button assembly 600 to be inserted into the groove 620 may be manufactured in process 1403. The button assembly 600 may include a waterproof member 630, a switch module 640 including a switch 641, a circuit board 650, and a first bracket 660. Regarding the structure of the button assembly 600, the structure of the electronic device 60 of FIGS. 6 to 8 may be referred to. The same reference numerals are used for the same or substantially the same components as those described above, and a redundant description will be omitted.

According to an embodiment, in process 1405, the manufactured button assembly 600 may be inserted into the groove 620 in the −y-axis direction in FIG. 6. The button assembly 600 may be disposed such that the protrusion 631 of the waterproof member 630 faces one surface 612 of the outer wall 611. A portion of the button assembly 600 may be supported by the bottom surface 621 of the groove 620.

According to an embodiment, in process 1407, at least one bracket may be inserted into the space between the inserted button assembly 600 and the inner wall 613. Regarding the structure and arrangement of the bracket, the structures of the electronic devices 60, 90, 110, 120, and 130 of FIGS. 6 and 10 to 13 may be referred to. The same reference numerals are used for the same or substantially the same components as those described above, and a redundant description will be omitted.

According to an embodiment, the inserted bracket may include a second bracket (e.g., the second bracket 670 in FIG. 6). According to an embodiment, the manufacturing method may include a process of manufacturing various structures of the second bracket (e.g., the second bracket 970 in FIG. 9). Regarding the various structures of the second bracket, FIGS. 10 to 13 may be referred to. The second bracket may be disposed on the button assembly (e.g., the button assembly 60 in FIG. 6) and the inner wall (e.g., the inner wall 613 in FIG. 6) to prevent the button assembly and the second bracket from moving due to the repulsive force of the waterproof member (e.g., the waterproof member 630 in FIG. 6). The second bracket prevents the button assembly from moving when the input button (e.g., the input button 680 in FIG. 6) moves in the x-axis direction, thereby sealing the space between the housing (e.g., the housing 610 in FIG. 6) and the waterproof member. The waterproof member may block inflow of foreign substances into the housing from the outside of the housing through an opening 614 in the housing. According to an embodiment, the manufacturing method may further include a process of disposing the support member 971 between the second bracket 970 and the inner wall 913. Regarding the arrangement of the support member 971, the structure of the electronic device 90 of FIGS. 9 and 10 may be referred to. The same reference numerals are used for the same or substantially the same components as those described above, and a redundant description will be omitted.

According to an embodiment, the process 1401 of molding a groove (e.g., the groove 1120 in FIG. 11) of the manufacturing method by a mold may further include a process of modifying the structure of an inner wall (e.g., the inner wall 1113 of FIG. 11). The inner wall according to an embodiment may include a shape of a recess (e.g., the recess 1115 in FIG. 11), an accommodation portion (e.g., the accommodation portion 1215 in FIG. 12), or a flange (e.g., the flange 1315 in FIG. 13). The groove, the accommodation, or the flange may be fabricated through CNC machining. However, the groove, the accommodation, or the flange is not limited thereto and may be molded by using a mold. According to an embodiment, the groove, the accommodation, or the flange may be manufactured by using a casting mold or an injection mold.

Various embodiments of the disclosure disclosed in the present specification and drawings are provided merely to represent specific examples for the purpose of easily describing the technical contents of the disclosure and helping the understanding of the disclosure, and are not intended to limit the scope of the disclosure. Accordingly, the scope of the disclosure is to be construed in such a manner that, in addition to the embodiments disclosed herein, all changes or modifications derived from the technical idea of the disclosure are included in the scope of the disclosure.

As described above, an electronic device (e.g., the electronic device 10 in FIG. 1) according to an embodiment may include a housing including an outer wall that defines a side surface of the electronic device and includes at least one opening and an inner wall spaced apart from the outer wall to provide a groove therebetween, an input button inserted into the opening, a waterproof member disposed between one surface of the housing and the inner wall and including a protrusion that comes into contact with one surface of the outer wall, a switch module including a switch, and a bracket disposed between the switch module and the inner wall. The protrusion may provide a structure in which a height of a first area is higher than a height of a second area with reference to a surface of the waterproof member corresponding to a position where the input button is disposed.

According to an embodiment, at least one of the outer wall and the inner wall may include an inclined surface that forms an inclined angle with respect to a surface perpendicular to a bottom surface of the groove.

According to an embodiment, the electronic device may further include a circuit board, and the switch may be configured to come into contact with a contact point of the circuit board that faces the switch to transmit a signal to the circuit board embedded in the switch module.

According to an embodiment, the bracket may be disposed such that one surface the bracket faces the switch module and at least one surface of the bracket faces the inner wall.

According to an embodiment, the electronic device may further include at least one support member that is disposed between the bracket and the inner wall and is configured to support the bracket from the inner wall.

According to an embodiment, the at least one support member may be disposed such that one surface thereof is connected to the bracket and another surface protrudes in a direction toward the inner wall relative to the bracket.

According to an embodiment, the electronic device may further include at least one accommodation portion configured to be capable of accommodating the support member on at least one surface of the bracket that comes into contact with the support member.

According to an embodiment, the inner wall may include, in one surface thereof, at least one recess in which the at least one support member is accommodated.

According to an embodiment, the electronic device may further include an adhesive member configured to bond the bracket and the support member to each other.

According to an embodiment, the first area may provide a structure of protruding to a portion above the second area with reference to a bottom surface of the groove from one surface of the waterproof member corresponding to a position where the input button is disposed.

According to an embodiment, the protrusion may include a third area interconnecting one ends the first area and the second area, and a fourth area interconnecting the other ends of the first area and the second and area facing the third area, wherein the third area and the fourth area may have a height that is gradually increases from the second area toward the first area with reference to the one surface of the waterproof member corresponding to the position where the input button is disposed.

According to an embodiment, the electronic device may further include an adhesive member configured to bond the bracket and the switch module to each other.

According to an embodiment, the bracket may include a first bracket facing the switch module and supporting the switch, and a second bracket disposed between the first bracket and the inner wall.

According to an embodiment, the second bracket may include a first portion facing the first bracket and inserted into the groove from an upper end of the inner wall, and a second portion extending from one end of the first portion and bent toward one surface of the inner wall, wherein the second portion may be configured to support the second bracket from the inner wall.

According to an embodiment, the inner wall may include, in one surface thereof, a recess configured to accommodate one end of the second portion.

According to an embodiment, the first portion may be configured such that the thickness thereof gradually increases toward the second portion to come into contact with the one surface of the inner wall.

According to an embodiment, the second bracket may further include a first portion facing the first bracket and inserted into the groove from an upper end of the inner wall, and a second portion including one end bent to directed to a direction in which one end of the first portion is directed and coming into contact with the one surface of the inner wall.

According to an embodiment, the inner wall may include, at a position corresponding to one end of the second portion, a flange in which a portion of the one surface of the inner wall protrudes inside the groove.

As described above, A method of manufacturing an electronic device (e.g., the electronic device 10 in FIG. 1) according to an embodiment may include a process of molding a housing including an outer wall that defines a side surface of the electronic device and includes at least one opening and an inner wall spaced apart from the outer wall to provide a groove therebetween, a process of manufacturing a button assembly including a waterproof member that is disposed between the outer wall and the inner wall and including a protrusion that comes into contact with one surface of the outer wall, and a first bracket that faces a switch module to support a switch, wherein the switch module is disposed between the waterproof member and the first bracket, a process of inserting the button assembly from an upper end of the inner wall into the groove such that the protrusion of the waterproof member comes into contact with the one surface of the outer wall, and a process of inserting, into the groove from the upper end of the inner wall, a second bracket disposed between the button assembly and the inner wall and configured to support the button assembly.

According to an embodiment, the inserting of the second bracket may further include disposing, between the first bracket and the inner wall, a support member configured to support the second bracket from the inner wall.

The invention claimed is:

1. An electronic device comprising:

a housing comprising an outer wall that defines a side surface of the electronic device and comprises at least one opening and an inner wall spaced apart from the outer wall to provide a groove therebetween;

an input button inserted into the opening;

a waterproof member disposed between the outer wall and the inner wall, the waterproof member comprising a protrusion that completely surrounds a seating portion on which the input button is seated, and comes into contact with an inclined surface of the outer wall, the inclined surface forming an inclined angle with respect to a surface perpendicular to a bottom surface of the groove;

a switch module comprising a switch; and a bracket disposed between the switch module and the inner wall, wherein the protrusion provides a structure including a first area and a second area extending from the first area, a height of the first area being higher than a height of the second area with reference to a surface of the waterproof member corresponding to a position where the input button is disposed.

2. The electronic device of claim 1, wherein the inner wall comprises an inclined surface that forms an inclined angle with respect to the surface perpendicular to the bottom surface of the groove.

3. The electronic device of claim 1, wherein the switch module further comprises a circuit board, and the switch is configured to come into contact with a contact point of the circuit board that faces the switch to transmit a signal to the circuit board embedded in the switch module.

4. The electronic device of claim 1, wherein the bracket is disposed such that one surface of the bracket faces the switch module and at least one surface of the bracket faces the inner wall.

5. The electronic device of claim 1, further comprising at least one support member disposed between the bracket and the inner wall and configured to support the bracket from the inner wall.

6. The electronic device of claim 5, wherein the at least one support member is disposed such that one surface thereof is connected to the bracket and another surface protrudes in a direction toward the inner wall relative to the bracket.

7. The electronic device of claim 5, further comprising at least one accommodation part configured to be capable of accommodating the at least one support member on at least one surface of the bracket that comes into contact with the at least one support member.

8. The electronic device of claim 5, wherein the inner wall comprises, in one surface thereof, at least one recess in which the at least one support member is accommodated.

9. The electronic device of claim 5, further comprising an adhesive member configured to bond the bracket and the at least one support member to each other.

10. The electronic device of claim 1, wherein the first area provides a structure protruding to a portion above the second area with reference to a bottom surface of the groove from one surface of the waterproof member corresponding to a position where the input button is disposed.

11. The electronic device of claim 1, wherein the protrusion comprises:

a third area interconnecting one ends of the first area and the second area; and a fourth area interconnecting other ends of the first area and the second area and facing the third area, and wherein the third area and the fourth area have a height that gradually increases from the second area toward the first area with reference to the one surface of the waterproof member corresponding to the position where the input button is disposed.

12. The electronic device of claim 1, wherein the bracket comprises:

a first bracket facing the switch module and supporting the switch; and a second bracket disposed between the first bracket and the inner wall.

13. The electronic device of claim 12, wherein the second bracket further comprises:

a first portion facing the first bracket and inserted into the groove from an upper end of the inner wall; and a second portion extending from one end of the first portion and bent toward one surface of the inner wall, and wherein the second portion is configured to support the second bracket from the inner wall.

14. A method of an electronic device, the method comprising:

molding a housing comprising an outer wall that defines a side surface of the electronic device and comprises at least one opening and an inner wall spaced apart from the outer wall to provide a groove therebetween;

manufacturing a button assembly comprising an input button, a waterproof member that is disposed between the outer wall and the inner wall, the waterproof member comprising a protrusion that completely surrounds a seating portion on which the input button is seated, wherein the protrusion comes into contact with an inclined surface of the outer wall, the inclined surface forming an inclined angle with respect to a surface perpendicular to a bottom surface of the groove, and a first bracket that faces a switch module to support a switch, wherein the switch module is disposed between the waterproof member and the first bracket, the protrusion providing a structure that includes a first area and a second area extending from the first area, a height of the first area being higher than a height of the second area with reference to a surface of the waterproof member corresponding to a position where the input button is disposed;

inserting the button assembly from an upper end of the inner wall into the groove such that the protrusion of the waterproof member comes into contact with the one surface of the outer wall; and inserting, into the groove from the upper end of the inner wall, a second bracket disposed between the button assembly and the inner wall and configured to support the button assembly.

15. The method of claim 14, wherein the inserting of the second bracket further comprises disposing, between the second bracket and the inner wall, a support member configured to support the second bracket from the inner wall.

16. An electronic device comprising:

a housing including an outer wall and an inner wall, the outer wall and the inner wall defining a groove; and a button assembly including a waterproof member, a first bracket, and a second bracket, and an input button, the first bracket interposed between the waterproof member and the second bracket, the button assembly inserted into the groove in a first direction so that the waterproof member contacts a first surface of the outer wall and so that the second bracket is inserted between the button assembly and the inner wall, the first surface forming an inclined angle with respect to a surface perpendicular to a bottom surface of the groove, the waterproof member including a protrusion that provides a structure having a first area and a second area extending from the first area so that a seating portion on which the input button is seated is arranged between the first area and the second area, a height of the first area being higher than a height of the second area with reference to a surface of the waterproof member corresponding to a position where the button assembly is disposed, wherein at least one surface of the second bracket has a shape corresponding to at least one surface of the inner wall to prevent the button assembly from moving due to a repulsive force of the waterproof member.

17. The electronic device of claim 16, wherein the at least one surface of the second bracket is in contact with the inner wall such that the second bracket is supported by the inner wall to fix the button assembly in place.

18. The electronic device of claim 17, wherein the input button is configured to move in a second direction perpendicular to the first direction.

19. The electronic device of claim 18, wherein when the input button moves in the second direction, the second bracket prevents movement of itself and the button assembly due to a repulsive force of the waterproof member.

20. The electronic device of claim 19, wherein the second bracket seals a space between the housing and the waterproof member by preventing the button assembly from moving when the input button moves in the second direction.

* * * * *